(No Model.)
E. M. LUNDHOLM.
SHUT-OFF CLAMP FOR HOSE.
No. 541,865. Patented July 2, 1895.
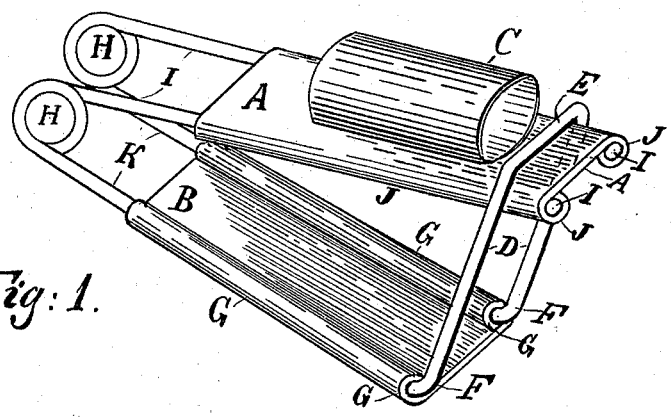
Fig: 1.
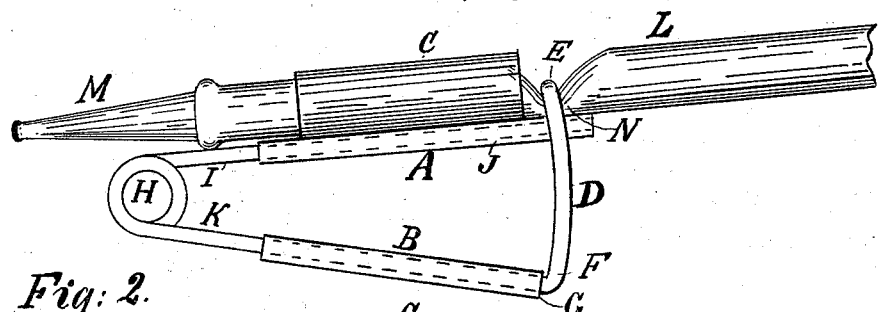
Fig: 2.
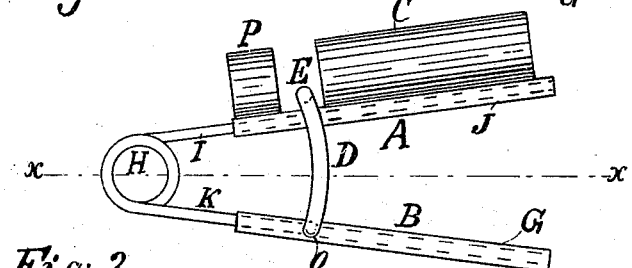
Fig: 3.
Fig: 6.
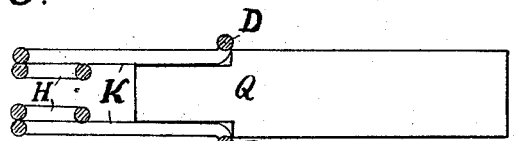
Fig: 4.
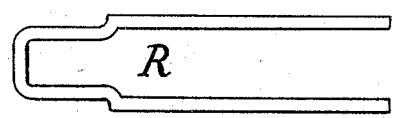
Fig: 5.
WITNESSES:
Emma Carlson
P. E. Carlsen.
INVENTOR:
Erik M. Lundholm
BY his ATTORNEY:
A. M. Carlsen.

UNITED STATES PATENT OFFICE.

ERIK M. LUNDHOLM, OF ST. PAUL, MINNESOTA.

SHUT-OFF CLAMP FOR HOSE.

SPECIFICATION forming part of Letters Patent No. 541,865, dated July 2, 1895.

Application filed November 19, 1894. Serial No. 529,236. (No model.)

*To all whom it may concern:*

Be it known that I, ERIK M. LUNDHOLM, a subject of the King of Sweden and Norway, residing at St. Paul, in the county of Ramsey and State of Minnesota, have invented certain new and useful Improvements in Shut-Off Clamps for Hose; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in hose clamps, of the class used instead of stop cocks for shutting off the flow of liquid, air or gas through a hose by squeezing the hose flat and thus closing its inner sides tightly against each other.

The objects of my invention are to provide a cheap, simple and effective hose clamp of such construction that it closes the hose by itself whenever it is released from the operator's hand, either intentionally or accidentally, and in which the hose is guarded from accidental squeezing. I attain these objects by the novel construction and combination of parts illustrated in the accompanying drawings, in which—

Figure 1 is a perspective view of my hose clamp. Fig. 2 is a side view of the clamp shown in Fig. 1, with a hose placed in it. Fig. 3 is a side view of a modification of my clamp. Fig. 4 is a plan view on the line x, x, in Fig. 3, with the plate B, removed. Figs. 5 and 6 are detail views of further modified parts.

Referring to the drawings by letters of reference, it will be seen that the clamp consists of two metallic plates A, and B, of which the plate A, is provided with a tubular hose guide C, secured upon the outer side of the plate. This guide also serves as a guard for preventing the hand or fingers from pressing on the hose and closing it when pressure is applied to the clamp for opening the hose.

D, is a wire bail of which the central bar E, bears against the outer side of the plate A, for squeezing the hose against the same. The ends F, of the bail are bent about at a right angle with the side arms of the bail and secured tightly in the over-bent side edges G, of the plate B, which they extend beyond and are formed into springs as H, of which the ends or bars I, are secured in the over-bent side edges J, of the plate A, which they help to stiffen, while the bars K, stiffen the plate B. The tendency of the springs H, is at all times to throw the plates A, and B, apart. Hence when a hose like L, having the nozzle M, in Fig. 2, is inserted between the bail bar E, and the plate A, and guided in the guide C, it is normally closed as at N, in Fig. 2, by the action of the springs H, and when a stream is desired from the nozzle M, the operator simply grasps the clamp in his hand and squeezes the plates A, and B, toward each other, so that the bail bar E, releases more or less of its pressure upon the hose, and when the operator ceases to press the clamp together it will close the hose again by the action of the spring H. This clamp may be greatly modified in its construction without diverging from the spirit of the invention. Some of the modifications I already make use of in some of the clamps are shown in Figs. 3, 4, 5, and 6.

In Fig. 3, it will be seen that the wire bars K, are not extended to the rear end of the plate B, but are taken up through the side notches O, of the plate and formed into the bail D, E, in front of the guide C, which arrangement makes the clamp more powerful, as the bail gets nearer to the springs H.

P, is an additional guide for the hose, or it may be made integral with the guide C, only with a notch or gap for the bail bar E. In this style of the clamp the notches O, weaken the plate B. Therefore I employ a stiffening plate as Q, in Fig. 5, laid in between the bars K, and secured in the over-bent side edges of the plate B.

Instead of the plate Q, I may simply use a wire bent like R, in Fig. 5, or again, I may dispense with both the plate Q, and the wire R, and stiffen the plate B, by giving it a longitudinal groove like S, in Fig. 6, which is an end view of the plate B, when stiffened in the last named manner.

The guide C, need not necessarily be entirely round or tube-shaped, but may be formed into a half or three-fourths or more of a circle and soldered or otherwise secured upon the plate A.

The usefulness of this clamp for a great variety of purposes where hose are used is so obvious that it is needless to point it out. One of its most excellent applications is shown in Fig. 1, of the drawings of my surgical cabinet and irrigating device, for which Letters Patent were granted on October 30, 1894, No. 528,232.

Having thus described my invention, what I claim as new, and wish to secure by Letters Patent, is—

1. A shut-off clamp for hose, consisting of two elongated plates or arms connected together at one end by springs the springs connecting the plates and tending to throw them apart, one of said plates having secured upon its outer side a substantially tubular hose guide, and the other plate having a hose closing bail embracing the first plate near by the hose guide, substantially as shown and described and for the purpose specified.

2. A shut-off clamp for hose, comprising the wire bail D, E, having the bars K, the springs H, and arms I, formed integral with the bail, the plate B, having its side edges embracing the bars K; the plate A, having its side edges secured upon the bars or arms I, and extending into the bail D, E, and a hose guide as C, P, secured upon the plate A, for guiding and guarding the hose, substantially as shown and described and for the purpose set forth.

In testimony whereof I affix my signature in presence of two witnesses.

ERIK M. LUNDHOLM.

Witnesses:
A. M. CARLSEN,
OLOF SOHLBERG.